United States Patent [19]

Garuti et al.

[11] Patent Number: 5,042,880
[45] Date of Patent: Aug. 27, 1991

[54] QUICK CHANGE WHEEL ASSEMBLY

[76] Inventors: Raymond R. Garuti, 182 Budding Ridge, Southington, Conn. 06489; Raymond Garuti, 188 Brook St., New Britain, Conn. 06051; Ronald M. Garuti, 11 Deepwood Rd., Farmington, Conn. 06032

[21] Appl. No.: 506,831

[22] Filed: Apr. 10, 1990

[51] Int. Cl.⁵ .............................................. F16B 39/02
[52] U.S. Cl. ................................. 301/9 DN; 301/111; 411/999
[58] Field of Search ............ 301/9 DN, 111; 411/999, 411/533, 544, 432

[56] References Cited

U.S. PATENT DOCUMENTS

| | | | |
|---|---|---|---|
| 1,867,095 | 7/1932 | Prescott et al. | 301/9 DN X |
| 1,940,617 | 12/1933 | Temple | 301/9 DN |
| 1,997,821 | 4/1935 | Gzupkaytie | 301/9 DN |
| 2,563,976 | 8/1951 | Torosian | 411/544 |
| 3,263,728 | 8/1966 | Lynch | 411/999 X |
| 3,295,578 | 1/1967 | Maloof | 411/999 X |
| 3,437,119 | 4/1969 | Dey | 411/999 X |
| 4,971,495 | 11/1990 | Docin | 301/9 DN X |

Primary Examiner—Russell D. Stormer
Attorney, Agent, or Firm—Richard C. Litman

[57] ABSTRACT

A wheel mounting assembly includes one or more nut assemblies, one for each lug stud receiving hole as provided in the wheel disc. Each nut assembly comprises a lug nut captively connected to the wheel disc by a coiled spring, with the spring configured and positioned such that the axes of the nut and disc hole remain coincident as the wheel is mounted upon the vehicle axle and the lug studs engage and axially displace the respective nuts. One spring end is affixed to the wheel disc adjacent each hole and the opposite end thereof is slidably disposed within an external recess int he nut body. In the normal at-rest condition, the spring convolutions form a coplanar spiral and maintain the captive nut flushly engaging the disc whereupon, when a lug stud enters the bottom portion of the nut and displaces it from the disc, the spring construction maintains the coincident relationship of the nut and stud axes to preclude jamming, cross-threading or stripping of the nut and stud threads during wrenching of the nuts about the studs.

8 Claims, 2 Drawing Sheets

QUICK CHANGE WHEEL ASSEMBLY

FIELD OF THE INVENTION

This invention relates to wheels and more particularly to an assembly to permit rapid mounting of a wheel assembly on a vehicle.

BACKGROUND OF THE INVENTION

In the field of automobile racing, in which even such small time-savings as seconds may influence the outcome, attention is increasingly paid to expediting the change of tires which are pre-mounted on spare wheels. Current practice is to glue lug nuts to each new wheel beforehand, so that the wheel assembly may be installed and the nuts tightened immediately thereafter without having to be handled individually. Given the haste practiced in this operation, it is possible to cause nuts to break free from the new wheel and become lost; also, nuts previously removed and abandoned may become scattered on the work floor, creating a minor safety hazard. Racers are therefore beginning to address this situation by using mechanical means to retain lug nuts.

DESCRIPTION OF THE RELATED ART

Several attempts have been made to provide improved means involved with wheel mounting to guide the associated parts as they are mated and fastened. U.S. Pat. No. 3,829,163 issued to Hans provides a sleeve in the wheel which cooperates with a bullet-nosed stud and which sleeve also has a conical contour on the outside to better engage a lug nut, yet is possible during installation of such a wheel that the protruding lug studs will break one or more lug nuts free from the prepared wheel and cause them to become lost. U.S. Pat. No. 4,225,191 issued to Knoski discloses magnets in the hub assembly to attract the wheel; has lug nuts retained in the wheel disc; and has removable headless lug bolts. However, such an arrangement requires a special tool to tighten the fasteners and no means are provided to retain fasteners in the wheel assembly.

Tethered fasteners per se have long been known, as exemplified by U.S. Pat. No. 3,437,119 issued to Dey. Another device presently being used by racers comprises a simple wire frame which secures a lug nut to a wheel disc. The wire frame engages the wheel disc by interengaging two holes disposed within the wheel disc and which biases the lug nut toward a lug stud hole in the wheel disc. This wire frame is fastened to its associated lug nut by surrounding a cylindrical section of the nut. A detriment of such construction is that no means are provided to insure that the nuts are returned with their wheel-engaging faces precisely parallel to the wheel disc prior to and during mounting of the wheel. Also, the wire frame lug nut retainer is too large to be used with some styles of wheels in use, particularly those in which lug bolt holes in the wheel disc are disposed in close proximity to a hub opening. With wheel styles which include a dished contour, the wire frame may not be held in a preferably parallel relationship to the wheel disc, possibly causing misalignment of the lug nut and lug stud.

Such misalignment between a nut and stud is a potentially troublesome problem in all known prior art attempts to retain fasteners due to the propensity of the fastener to cross-thread during tightening. This will cause undesirable delay when corrected, and may cause safety hazards during the race if undetected.

The above problem can surface in various types of wheel mounting assemblies, not only in those installations wherein a wheel disc is provided with a plurality of openings adapted to receive a similar number of threaded studs. Special assemblies such as in Formula 1 category sports cars and Indy race cars, employ a single large nut to attach the wheels.

SUMMARY OF THE INVENTION

By the present invention an improved quick-change wheel assembly is provided which overcomes the above-noted shortcomings and offers a rapid, reliable manner of assuring a positive, accurate and rapid alignment of any number of nuts as carried by a wheel, when the wheel disc hole or holes are slipped over the stud or studs of an axle hub.

Accordingly, one of the objects of the present invention is to provide a quick-change wheel assembly which cooperates with all the mounting studs as disposed on a vehicle axle hub.

Another object is to provide a quick-change wheel assembly including resilient retention means captively mounting each lug nut to the wheel disc.

An additional object is to provide a quick-change wheel assembly provided with captively secured lug nut(s) including means insuring proper coaxial alignment of the respective lug nut(s) with the corresponding number of threaded studs of a wheel hub.

A further object is to provide a quick-change wheel assembly with lug nut retaining members configured to accommodate even a large number of lug nuts on a relatively small-diameter wheel disc.

Another object is to provide a quick-change wheel assembly including lug nuts captively retained to a wheel disc by helically and spirally wound springs allowing of true axial displacement of the nuts from an at-rest position flush with the wheel disc.

With these and other objects in view which will more readily appear as the nature of the invention is better understood, the invention consists in the novel construction, combination and assembly of parts hereinafter more fully described, illustrated, and claimed with reference being made to the attached drawings.

DETAILED DESCRIPTION OF THE PREFERRED EMBODIMENT

Figure 1:
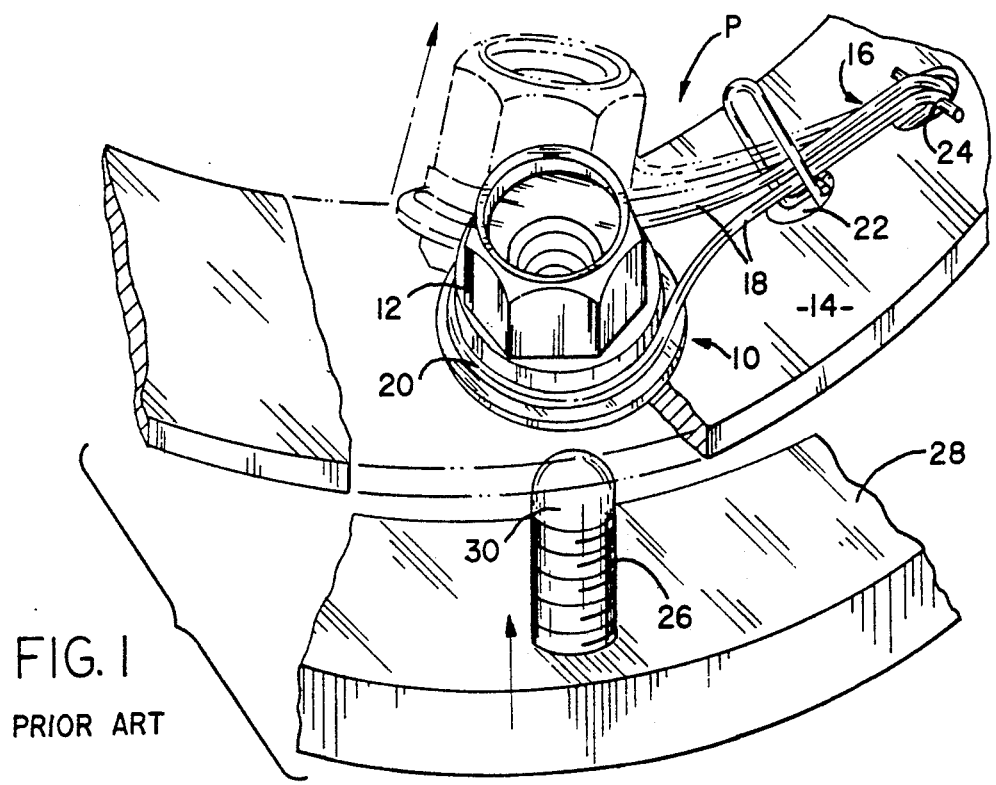
FIG. 1 is a fragmentary perspective view of a captive lug nut according to a prior art device.

Referring now to the drawings, FIG. 1 illustrates a prior known wheel mounting assembly P incorporating captive lug nuts and a description thereof will serve to explain the general concept of a wheel mounting assembly containing captive nuts as well as point out problems associated therewith and which are addressed by the improvement according to the instant invention. In this fragmentary view, a single one of what will be understood to comprise a plurality of nut assemblies 10 is shown and wherein a lug nut 12 is captively secured to a wheel disc 14 by means of a spring device 16. In this assembly, the spring device 16 will be seen to comprise a pair of substantially elongated wire portions 18—18 cooperating to form at one end, a single partial loop 20 loosely engaging the nut 12. The opposite ends of the wire portions 18—18 extend to pass sequentially through two openings 22,24 formed through the disc 14 and radially spaced from the contained nut 12. In use, the wire portions 18—18 are configured to place the captive nut 12 in a position generally overlying a lug stud opening (not shown) as provided in the wheel disc 14. It will be appreciated that a typical vehicle wheel is mounted by means of lug nuts cooperating with five or more lug studs 26 as projecting from an axle hub 28. Thus, a corresponding number of captive nut assemblies will be provided, each mounted to overlie a respective disc stud opening. As the wheel assembly P of FIG. 1 is being mounted, the wheel disc 14 is moved toward the hub 28 and the wheel disc angularly shifted to initiate the passage of the stud noses 30 through the wheel disc holes. It is rare that the plane of the wheel disc 14 will be exactly parallel with that of the face of the axle hub 28 but even if this rare condition is present, the nuts 12 of FIG. 1 will be seen to be free to assume an angularly offset and tilted disposition, in view of the pivot point as established by the spring device as it passes through the disc opening 24. This unpredictable canting of one or more nuts 12 during the mounting operation is the very shortcoming as previously encountered and quite obviously can lead to jamming, thread stripping or cross-threading when a power wrenching apparatus is applied thereto.

Figure 2:
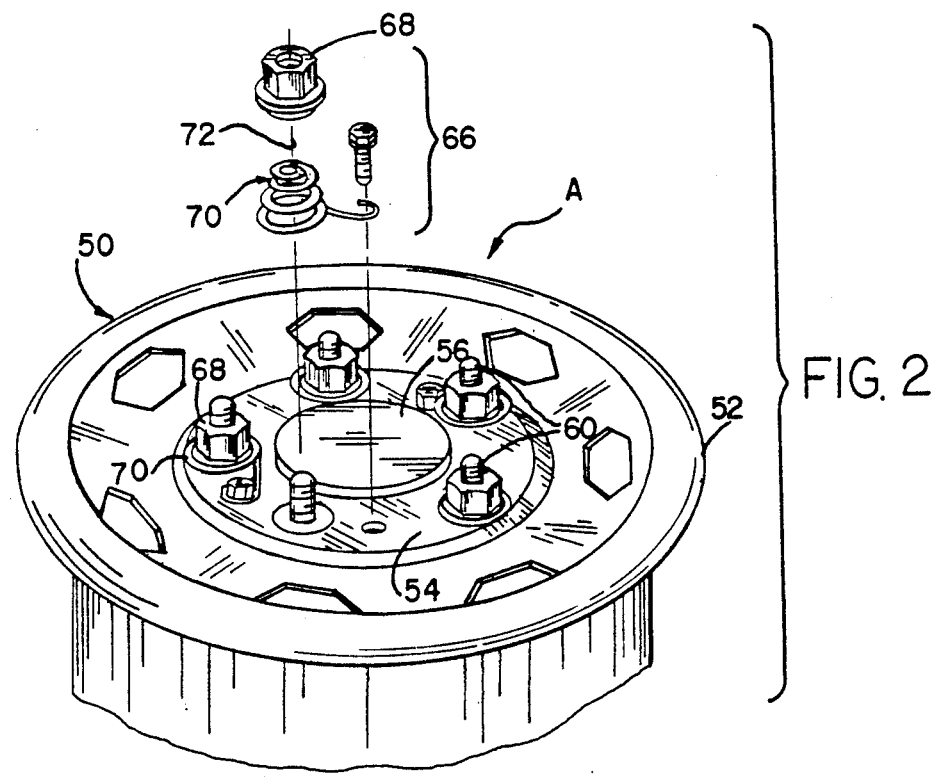
FIG. 2 is a perspective view of the present invention as mounted on a vehicle axle hub, with one nut assembly shown in expanded view.
Figure 3:
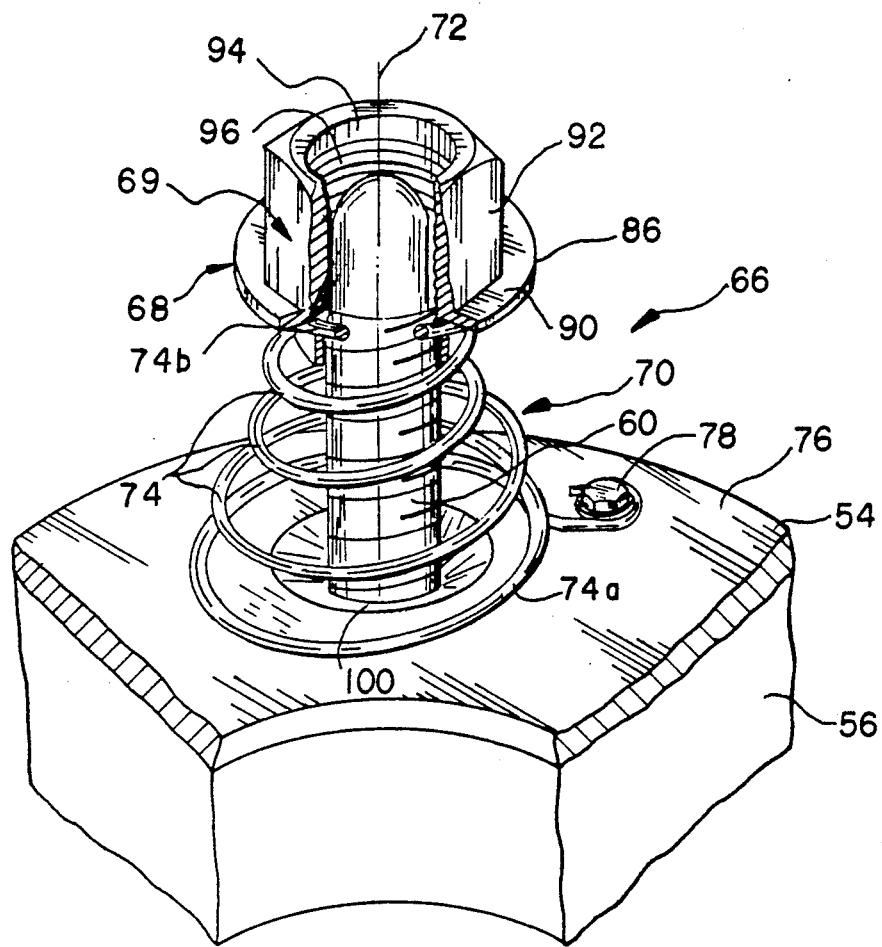
FIG. 3 is a partially cut away section shown in perspective, of a single nut assembly as partially mounted on a vehicle.
Figure 4:
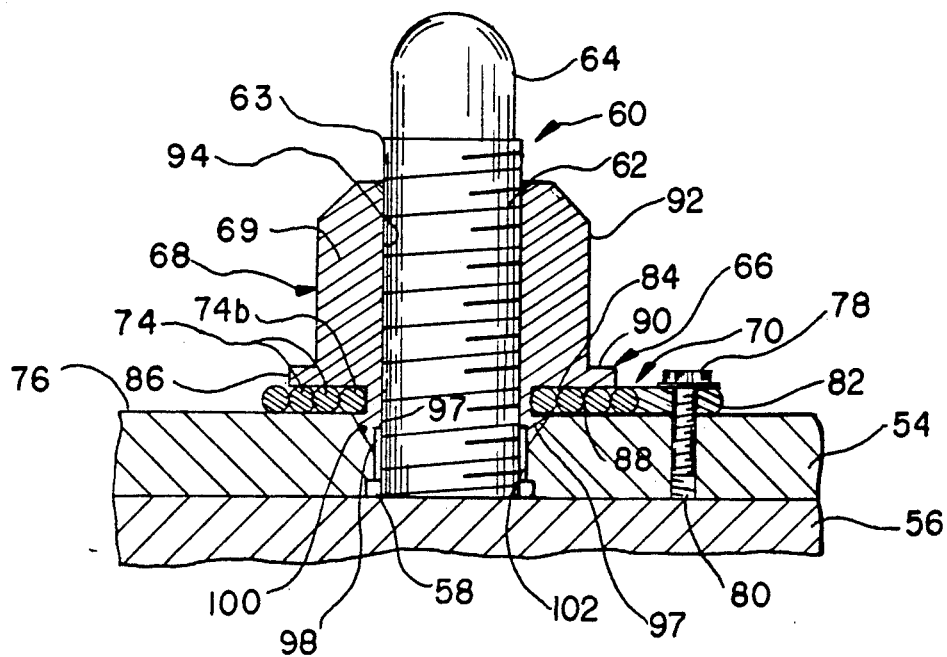
FIG. 4 is a side elevation partially in section, of the nut assembly of FIG. 3 as it appears when fully mounted on a vehicle.

An improved wheel assembly A according to the present invention is shown most clearly in FIG. 2 wherein a wheel 50 having a rim 52 spanned by a disc 54 is mounted against an axle hub 56. This mounting action and the subsequent fixation, is achieved by means of the structure as illustrated in FIGS. 2-4 and wherein the wheel disc 54 will be seen to include a plurality of circularly arranged holes 58, corresponding in number and angular spacing, to the plurality of lug studs 60 as projecting from the vehicle axle hub 56.

It is appropriate to mention at this point that although the assembly A as illustrated, represents an installation wherein a plurality of circularly arranged attachment members are provided, the very concept as disclosed will apply if but a single threaded stud or the like extends from an axle hub. As previously mentioned, certain categories of race cars employ such a wheel assembly with the single, enlarged threaded stud retaining the wheel by means of a correspondingly larger lug nut. Accordingly, throughout this description, it will be understood that although not specifically illustrated, the instant invention may be practiced with but a single stud and nut. In any case, the studs 60 are provided with external threads 62 extending from their base to a point well short of the end thereof with this end comprising a smoothly rounded nose 64 the diameter of which is preferably less than that of said threads 62.

The securing of the wheel 50 is accomplished by providing a nut assembly 66 attached to the wheel disc 54 adjacent each disc hole 58. A description of any one such nut assembly 66 will serve to described all of these assemblies. Each assembly 66 includes a lug nut 68, captively secured by retaining and alignment means comprising a coiled spring 70. The construction of the spring 70, its captive relationship with the nut 68 and its attachment to the wheel disc 54 have been calculated to insure a most advantageous operation during the mounting of the wheel 50. The underlying feature attributable to the enhanced operation of the instant assembly is that the anchored spring 70 maintains the central, longitudinal axis of the nut 68 coincident with that of the lug stud 60 throughout the wheel mounting operation. These coinciding axes are depicted by the reference numeral 72 in FIGS. 2 and 3. In this manner, the jamming, cross-threading or stripping of the cooperating threads of the nut and stud are avoided, both when the wheel is initially moved toward an axle hub and thereafter during the power wrenching step.

The spring 70 will be understood primarily to be spirally wound. That is, in the relaxed condition as viewed in FIG. 4, the plurality of convolutions 74 are adjacently disposed in a single plane. The spring is normally retained in this plane, which is parallel to the outer surface 76 of the wheel disk, by means of a fastener 78 which may comprise a suitable threaded member engaging a tapped bore 80 in the wheel disk 54 or alternatively, other types of fasteners, such rivets (not shown). This fastener 78 anchors a loop 82 formed at one fixed end of the spring 70, at a point slightly radially spaced from the largest diameter spring convolution 74a, which convolution remains the lowermost one when the spring is in the distended configuration as shown in FIG. 3.

The opposite end of the spring 70 or the inner convolution 74b as viewed in FIG. 4 and the uppermost convolution when positioned as in FIG. 3, serves to provide permanent attachment means captively engaging the nut 68. This angular end portion 74b is slidably disposed within an annular recess or groove 84 as provided within the lower portion of the nut. The groove 84 extends radially outward, beneath a radial flange 86 the latter of which defines the maximum diameter of the nut 68. The flange 86 serves two purposes. First, it radially extends the depth of the adjacent groove 84 so that an enlarged downwardly facing bearing surface 88 is provided so that more than one spring convolution 74–74a is shrouded and thus protected, when the nut assembly is secured as in FIG. 4. Additionally, the flange 86 presents a shoulder or stop surface 90 immediately beneath the wrench flats 92 on the upper portion 69 of the nut so as to preclude the end of a wrench socket from engaging and possibly damaging the spring member 70.

The lug nut 68 includes a central, axial bore 94 bounded by threads 96 adapted to cooperate with the threads 62 of the stud 60. The bottom portion 97 of the nut, beneath the peripheral groove 84, will be seen to be formed as a frusto-conical configuration thus providing an inwardly tapered external surface 98 adapted to mate with a similar configuration as defined by a countersink surface 100 surrounding each wheel disk hole 58. The interior of the nut bottom portion 97 includes an enlarged, smooth-wall bore 102, the internal diameter of which is slightly greater than the crest of the stud threads 62 for reasons which will become obvious hereinafter.

In the operation of the present invention, it will be understood that a wheel 50 will be provided with a nut assembly 66 for all of the disc holes 58 and prior to the actual mounting of the thus-equipped wheel, the plurality of nut assemblies 66 will each appear in the position as shown in FIG. 4 of the drawings. That is, the spirally wound spring 70 is disposed with all its convolutions 74, 74a, 74b within a common plane, parallel to and flushly engaging the outer surface 76 of the wheel disc 54. The resilience of the spring 70 is selected to insure that when the wheel disc is disposed in a substantially vertical plane, as during the initial mounting stage, the attached nuts 68 will be retained with their axes 72 coincident with the axes of the respective disc holes 58 with the nut bottom portions 97 nested within the countersunk surfaces 100 of the disc.

As a user advances the wheel disc 54 toward the vehicle lug studs 60, the noses 64 thereof first enter the enlarged smooth bore 102 of the plurality of nuts 68 and thence are urged into the axially adjacent threaded bore 94. During this stage, the rounded noses 64 serve as interference-free guide means and when the leading portion 63 of the stud threads 62 enter the bottom portion of the nuts, this interference-free condition still exists since the stud thread diameter is less than that of the nut bottom bore portion 102. By the time the wheel has been moved toward the axle hub 56 enough to cause engagement of the stud leading thread 63 with the nut bottom thread 97, a substantial portion of the stud length has already entered the nut bore 94 to insure the maximum coincidence of the stud and nut axes 72 and when the wheel is moved further toward the axle hub, the axially aligned components will appear as in FIG. 3. During this latter movement, the coincidence of the component axes remains undisturbed in view of the unique captive attachment of the respective nuts 68 by the springs 70. It will be appreciated that this critical orientation is maintained due to the axial expansion of the plurality of the spiral spring convolutions. When a wrench socket (not shown) is applied to the individual nuts 68 and then rotated, the precisely aligned and supported nuts are smoothly affixed to the studs as the nut threads 96 travel down the stud threads 62 until the components are seated as shown in FIG. 4. During this final stage, the nuts are unencumbered by the springs 70 since at least the topmost convolution 74b remains slidably engaged within the nut groove 84.

Our invention is not limited to the particular embodiment thereof illustrated and desired herein and we set forth its scope in the following claims.

We claim:

1. A nut emplacing apparatus for use on a surface of an automotive wheel comprising:

a nut body having an upper end and a lower end, said body including a cylindrical bore with internal threads and means for turning by a wrench, said means for turning adjacent said upper end, said body including a cylindrical outside portion coaxial with said bore, said cylindrical outside portion disposed below said means for turning;

a circular groove disposed around and coaxial with said cylindrical outside portion, said groove having a bottom and side walls, said bottom having a minimum groove diameter, and said groove having a maximum groove diameter defined by an outer edge of one of said groove side walls;

a wire wound spring having an inner end and an outer end and including a helical portion, said spring lying essentially in a plane when no forces are exerted upon said spring, said outer end lying in said plane and extending outwardly from said helical portion, said inner end generally describing a circle, said circle disposed within said helical portion, said circle having an inner diameter greater than said minimum groove diameter and less than said maximum groove diameter, said inner end of said spring disposed within said groove to allow sliding of said spring inner end within said groove and relative rotation of said spring and said nut body;

spring holding means adapted to fix said outer end of said spring to the surface of the automotive wheel so that said spring lies upon the surface of the automotive wheel, and to prevent motion and rotation of said outer end relative to the surface of the automotive wheel;

nut body locating means for holding said nut body in translational and angular alignment with a point on the surface of the automotive wheel when said body is held adjacent the surface of the automotive wheel by said spring; whereby said nut is resiliently held in position for threaded engagement with an externally threaded member aligned to said point.

2. An apparatus as in claim 1 wherein said nut body locating means includes a conical region of said body, said region coaxial with said internal threads and adjacent said lower end;

a conical depression centered on said point on the surface, said depression adapted to mate with said conical region for locating said nut to said position on the surface of the automotive wheel; and wherein said groove is disposed relative to said conical region such that said conical region is held in mating contact with said conical depression by said spring, whereby said nut body is precisely aligned to the surface of the automotive wheel.

3. An apparatus as in claim 2 including a flange extending from said body, said flange disposed below said means for turning by a wrench, said flange of greater extension than said means, whereby the wrench will not slide down past said flange when engaging said means.

4. An apparatus as in claim 3 wherein said flange comprises an upper side wall of said groove.

5. An apparatus as in claim 2 including an unthreaded length of said bore adjacent said lower end of said body for self aligning engagement with said externally threaded member.

6. A nut emplacing apparatus according to claim 2 wherein said nut body, said wire wound spring and said spring holding means define a subassembly, and including a plurality of said subassemblies fixed to the surface of the automotive wheel, all of said subassemblies having their bores mutually parallel, a structure matable with the surface of the automotive wheel, said structure including studs extending mutually parallel from said structure, each said stud aligned to mate with a respective subassembly, and a plurality of cylindrical holes through the surface of the automotive wheel, each one said hole coaxial with a said bore of a respective one of said nut bodies.

7. A nut emplacing apparatus according to claim 6 wherein
each said stud includes an unthreaded guiding portion distal said structure.

8. A nut emplacing apparatus according to claim 6 wherein
the surface of the automotive wheel is the central portion of the automotive wheel and said structure is a part of an axle.

* * * * *